Nov. 22, 1966  H. N. UNDERWOOD ET AL  3,287,039
PISTON AND PISTON ROD ASSEMBLY
Original Filed March 26, 1962
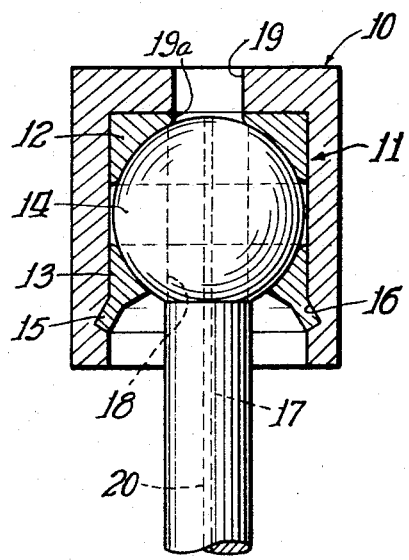
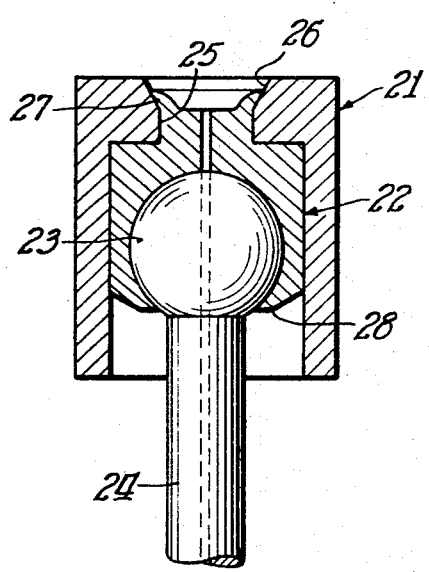
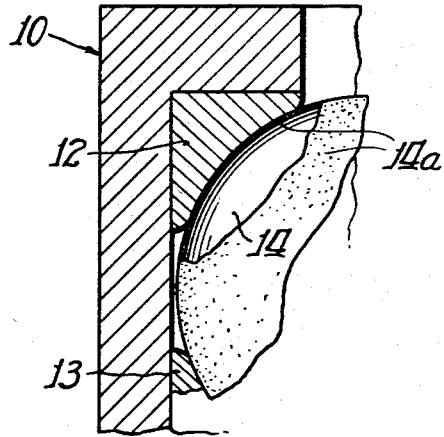
Inventors:
Herbert N. Underwood
and Thomas G. Dietrich
By F. A. Kinnunen  Atty.

United States Patent Office 3,287,039
Patented Nov. 22, 1966

3,287,039
PISTON AND PISTON ROD ASSEMBLY
Herbert N. Underwood, Chicago, and Thomas G. Dietrich, Roselle, Ill., assignors to Borg-Warner Corporation, Chicago, Ill., a corporation of Illinois
Original application Mar. 26, 1962, Ser. No. 182,356, now Patent No. 3,191,264, dated June 29, 1965. Divided and this application June 14, 1965, Ser. No. 476,773
2 Claims. (Cl. 287—21)

This application is a division of Serial No. 182,356, Herbert N. Underwood et al., entitled, "Method of Making a Piston and a Piston Rod Assembly," filed March 26, 1962 and now Patent No. 3,191,264.

The present invention relates to ball and socket joints for piston pumps and in particular to an improved ball-and-socket joint and an improved method of fabrication.

As is well known, a ball and socket joint comprises a ball as the inner part and a socket as the outer part.

In common practice, the fitting of a ball joint in a piston pump, or similar application, is time consuming. It comprises the machining of a socket and then closing the socket over the ball to form a swivel joint. After the ball and socket are thus assembled a lapping compound is introduced between the ball and the socket and the parts "worked in" until the proper freedom of the joint is obtained. The joint is then cleaned to eliminate the lapping compound. The assembly is then inserted into a piston, the lower end of which is open to receive the assembly. The socket is then fixed within the piston.

The present invention contemplates providing the socket and ball with the proper interior and exterior surface finishes, respectively, and then coating the ball, preferably by dipping, with a thin film, or coating, of lacquer or similar soluble material of a thickness to provide the required clearance between the socket and the ball. The ball is then assembled in the socket and tightly secured therein. The assembled parts are then put in an ultrasonic lacquer thinner or other solvent bath to remove the coating, thus providing a finished joint with proper clearance. The assembly is then fixed within the piston.

It is therefore an object of the present invention to provide an improved method of fabricating ball and socket joints.

It is a further object of the present invention to provide an improved ball and socket joint which is economical to manufacture.

The present invention consists of the novel methods, constructions, arrangements and devices to be hereinafter described and claimed for carrying out the above stated objects and such other objects as will be apparent from the following description of preferred forms of the invention, illustrated with reference to the accompanying drawings, wherein:

FIGURE 1 is a vertical view of a piston rod connected to a ball assembled in a socket within a piston, shown in cross section, according to the present invention;

FIGURE 2 is a vertical view of a piston rod connected to a ball assembled in a socket within a piston, shown in cross section, according to conventional practice; and FIGURE 3 is a fragmentary view of FIGURE 1 showing the soluble coating, exaggerated, covering the ball.

Referring now to the drawings, FIGURE 1 discloses a piston 10 having assembled therein a socket 11 comprising an upper part 12 and a lower part 13 encompassing a ball 14. The socket 11 is secured in the piston 10 by means of an annular flange 15, which in the process of assembling is expanded into an annular groove 16 in the lower end of the piston 10. A piston rod 17 is secured to the ball 14 within an opening 18 therein by means of press fitting. The upper end of the piston 10 is provided with an opening 19 and a corresponding opening 19a is provided in the upper part 12 of the socket 11 in communication with the ball 14 for purposes of lubrication. A conventional longitudinal passage 20 extends through the piston rod 17 to serve as a means for lubricating the other end of the piston rod connection, not shown.

In FIGURE 3 the ball 14 having a soluble coating 14A is shown firmly assembled within the socket 11 and piston 10 preparatory for the removal of the coating 14a by means of a solvent. The soluble coating 14a is exaggerated for convenience and purpose of illustration.

Referring now to FIGURE 2, a conventional ball and socket assembly within a piston is shown, the components of which will be identified briefly. This conventional construction is shown along with applicant's unique design disclosed in FIGURE 1, because a method according to the present invention is applicable to both, as hereinafter more fully explained.

A piston 21 is shown, having assembled therein a socket 22 encompassing a ball 23 connected to a piston rod 24. The upper end of the piston 21 is provided with an opening 25 having an annular flare 26 serving as a means for anchoring the socket 22 by expanding an annular flange 27 at the upper end thereof against the inner periphery of the annular flare 26. The lower end of the socket is provided with an annular flange or lip 28, having a diameter, such, that the ball may be inserted into the socket during the process of assembling after which the annular lip 28 is closed by conventional means to secure the ball 23 within the socket 22.

As heretofore stated, the method according to the present invention is applicable to both the conventional piston and applicant's piston, and concerns itself, primarily, with providing the proper clearance between the ball 14 and the socket 11, and the ball 23 and the socket 22 as disclosed in FIGURES 1 and 2, respectively.

The method of manufacturing a ball-and-socket joint according to the present invention comprises the steps of finishing the interior surface of the upper and lower parts, 12 and 13 respectively, by conventional means such as using a tungsten carbide ball of appropriate size and placing it under pressure against the interior surfaces of the socket parts 12 and 13. The ball 14 is dipped in a lacquer bath, or similar soluble material, to provide the soluble coating 14a. The upper part 12 of the socket 11 is inserted into the piston 10 and the coated ball 14 is then inserted in the piston 10 into engagement with the upper part 12, which is followed by assembling the lower part 13 over the ball 14 and expanding the annular flange 15 into the annular groove 16 of the cylinder 10, thus locking the ball and socket therein. The assembled parts are then placed in an ultra-sonic lacquer thinner bath which removes the soluble coating 14a thereby providing the required clearance between the ball and the socket. One end of the piston rod 17 is then secured in the ball 14 within an opening 18 therein by means of press fitting. The end of the piston rod 17 may be coated with a rust producing formula before it is secured in the ball 14 whereby the resulting corrosion within the opening 18 would tend to more effectively provide an inseparable connection.

In fabricating a conventional piston provided with a ball-and-socket joint as shown in FIGURE 2, the steps comprise coating the ball 23 as heretofore described with respect to ball 14 and inserting it in the socket 22, then closing the annular lip 28 against the ball 23 which seals it within the socket 22. The soluble coating is then removed as heretofore shown and the assembled ball and socket is then inserted in the piston 21 after which the annular flange 27 is expanded against the annular flare 26, thus locking the ball and socket within the piston 21.

It is to be understood that the method according to the present invention is applicable to other ball and socket applications, such as, to a slipper socket and ball joint used in piston pumps.

While this invention has been described in connection with certain specific embodiments thereof, it is to be understood that is by way of illustration and not by way of limitation and the scope of this invention is defined solely by the appended claims which should be construed as broadly as the prior art will permit.

We claim:
1. A piston and rod assembly comprising:
   (a) a piston having a cylindrical bore therein, provided with an annular groove in its lower end,
   (b) a socket comprising upper and lower annular bearing parts cylindrically contoured on their outer peripheries and fitted into said cylindrical bore, said upper and lower parts having hemispherical contours on their inner peripheries,
   (c) a piston rod having a ball at one end thereof, encompassed by said hemispherical contours of said upper and lower parts, and
   (d) an annular flange at the bottom of said lower part in engagement with said annular groove thereby locking the piston rod assembly in said piston.
2. A piston rod assembly according to claim 1, wherein the said piston rod, including said ball are provided with a longitudinal passage thereto in fluid communication with an opening in the said upper part of said socket and a corresponding opening in the said piston.

References Cited by the Examiner
UNITED STATES PATENTS

| | | | |
|---|---|---|---|
| 1,543,498 | 6/1925 | Hammond | 287—21 |
| 1,664,189 | 3/1928 | Claus | 308—72 |
| 1,995,570 | 3/1935 | Lewis | 287—87 |
| 2,296,469 | 9/1942 | Kastler | 287—21 X |
| 2,380,150 | 7/1945 | Collito | 308—72 |
| 2,516,688 | 7/1950 | Flumerfelt. | |
| 2,701,409 | 2/1955 | Heim | 308—72 X |
| 3,008,743 | 11/1961 | Westercamp. | |

CARL W. TOMLIN, *Primary Examiner.*

A. V. KUNDRAT, *Assistant Examiner.*